Feb. 22, 1938.    S. F. ADAM    2,109,408
VEHICLE DIRECTION SIGNAL
Filed Jan. 12, 1937    4 Sheets-Sheet 1

INVENTOR:
S. Fenner Adam.
BY
ATTORNEY.

Feb. 22, 1938.    S. F. ADAM    2,109,408
VEHICLE DIRECTION SIGNAL
Filed Jan. 12, 1937    4 Sheets-Sheet 2

INVENTOR:
S. Fenner Adam.
BY
ATTORNEY.

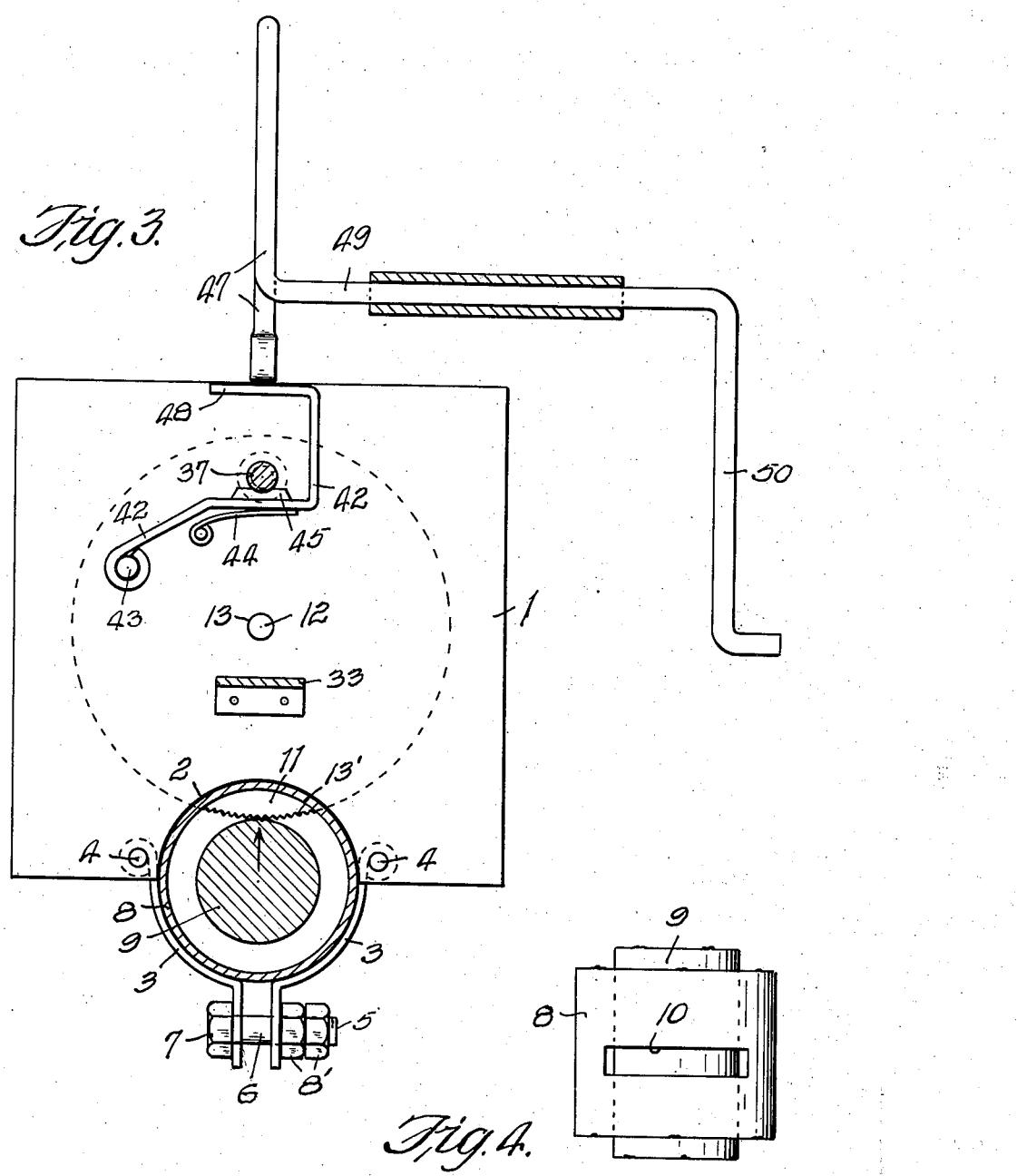

Feb. 22, 1938.                S. F. ADAM                    2,109,408
                         VEHICLE DIRECTION SIGNAL
                          Filed Jan. 12, 1937          4 Sheets-Sheet 4

INVENTOR:
BY S. Fenner Adam.
ATTORNEY.

UNITED STATES PATENT OFFICE 2,109,408

VEHICLE DIRECTION SIGNAL

Sidney Fenner Adam, St. Louis, Mo., assignor of one-third to Robert Gordon Adam and one-third to Florence Smith Adam, both of St. Louis, Mo.

Application January 12, 1937, Serial No. 120,208

6 Claims. (Cl. 177—339)

This invention relates to automobile direction signals, although not necessarily limited thereto.

The primary object of my invention is the provision of a signal device whereby traffic direction signals such, for instance, as "left-turn" and "right-turn" signals are automatically displayed at the rear, or at the front and the rear of a motor vehicle upon slight turning movement of the steering post of the motor vehicle.

Another object of the invention resides in the provision of a main circuit, a pair of signal lamp operating circuits, and a switch responsive to turning movement in either direction of the steering post of a motor vehicle from neutral position for connecting the signal operating circuit, indicative of the direction of the turning movement, with the main circuit.

A further object of the invention resides in the provision of a signal device, as stated in the preceding paragraph, and, wherein a circuit breaking device is in the main circuit, and, wherein the main circuit is broken when the steering wheels of a motor vehicle are in straight away position and remains broken regardless of the turning movements of the steering post until the foot accelerator of an automobile is released of foot pressure to close the main circuit.

A still further object of the invention resides in a switch between the main circuit and the signal operating circuits, which is responsive to movement of a steering post for selectively connecting the signal operating circuits with the main circuit.

A still further object of the invention resides in means automatically rendering the circuit breaker inoperative and the main circuit open, and closing the main circuit through the circuit breaker by means responsive to the release action of a foot accelerator of a motor vehicle.

A still further object of the invention is the provision of a traffic direction signal which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:—

Fig. 3 is a view of the signal instrument taken on line 3—3 of Fig. 1.

Fig. 4 is a fragmentary view of the steering post and slotted mast through which the steering post passes.

Figure 1:
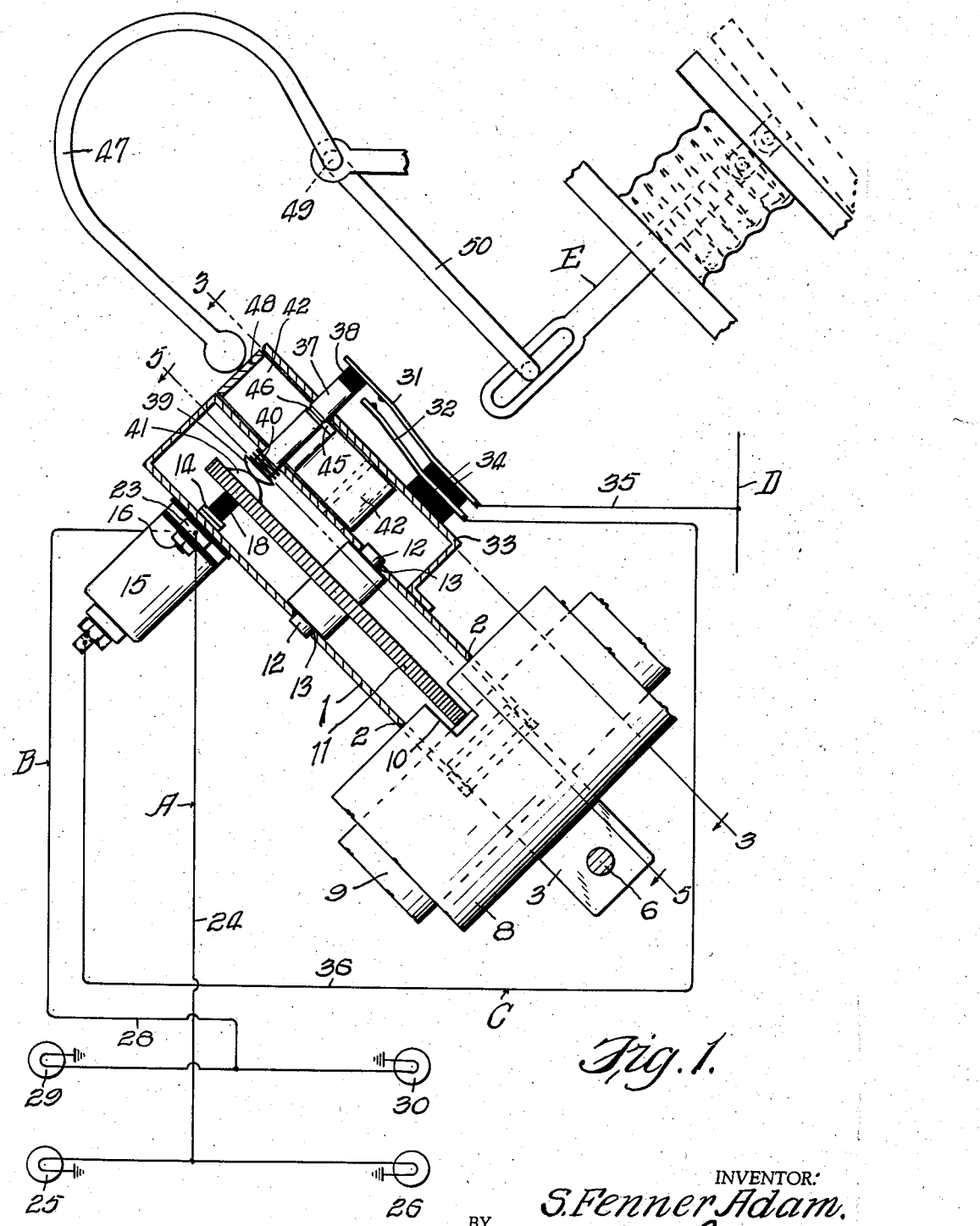
Fig. 1 is a view partly diagrammatic, showing one embodiment of the invention together with associated electrical connections organized to form the several electric controls necessary to meet the several functions required when the invention is embodied in a form for use as a left and right-turn signal system of an automotive vehicle, the main circuit being shown as open.
Figure 2:
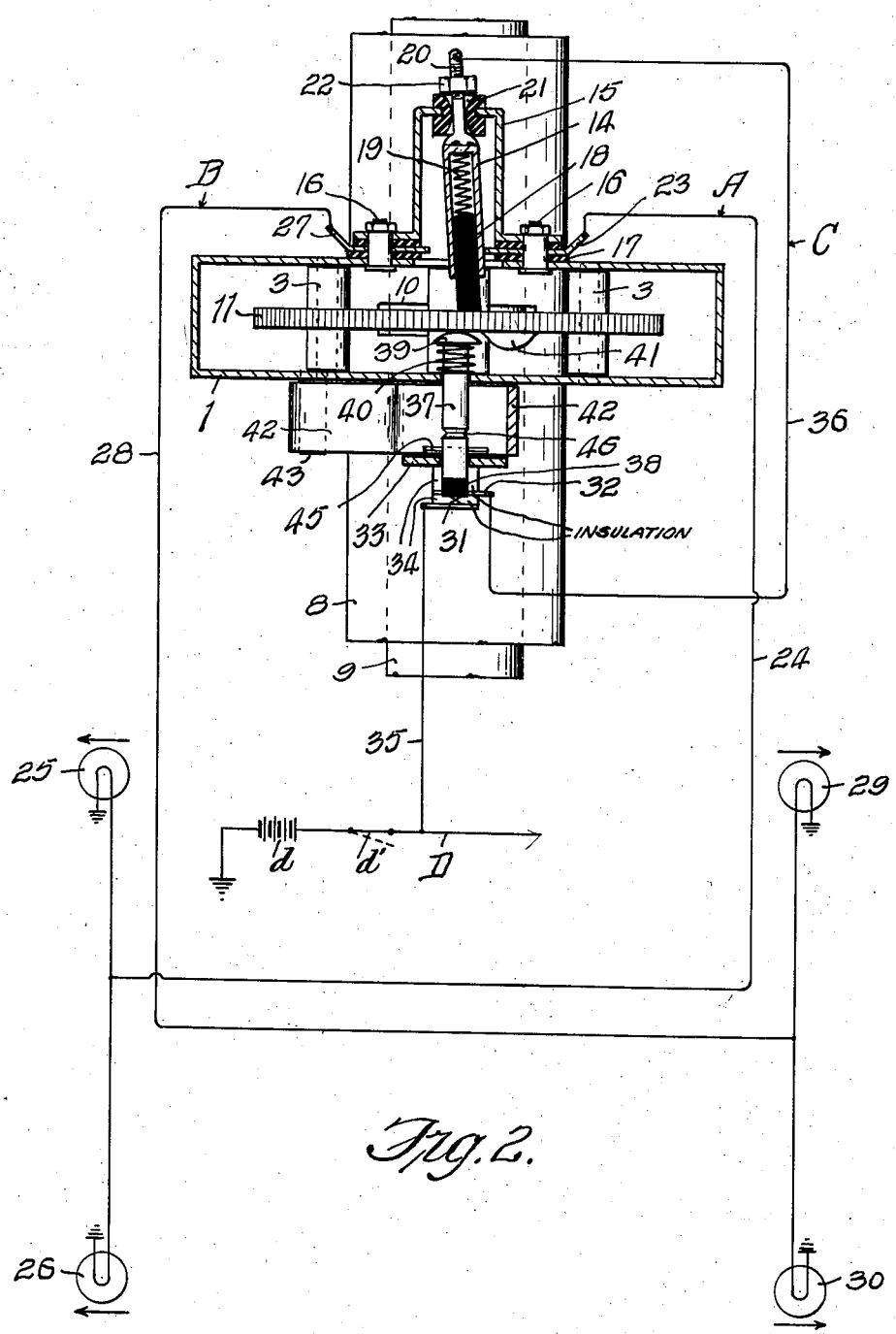
Fig. 2 is a view, partly diagrammatic, showing the main circuit closed, and one of operating signal circuits closed.
Figure 5:
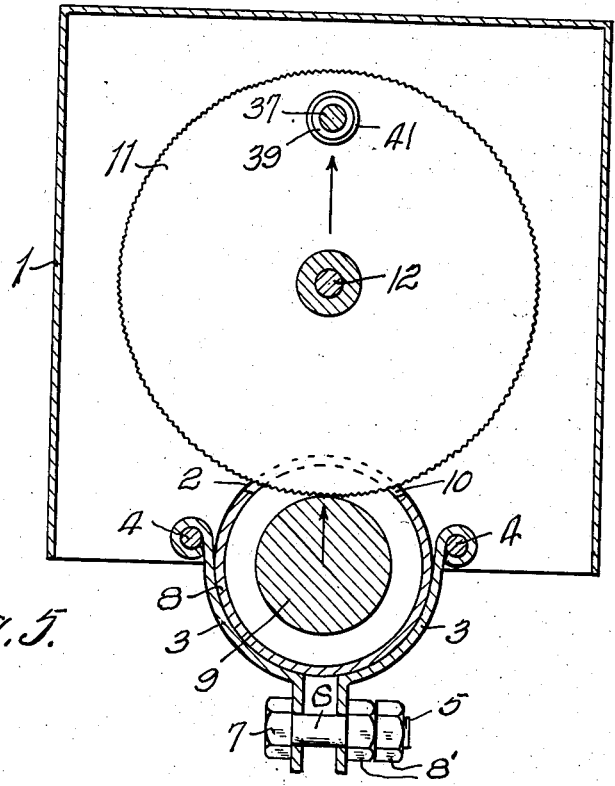
Fig. 5 is a view of the instrument, steering post and mast looking in direction of the arrows 5—5 in Fig. 1, which is indicative of the main circuit being open.
Figure 6:
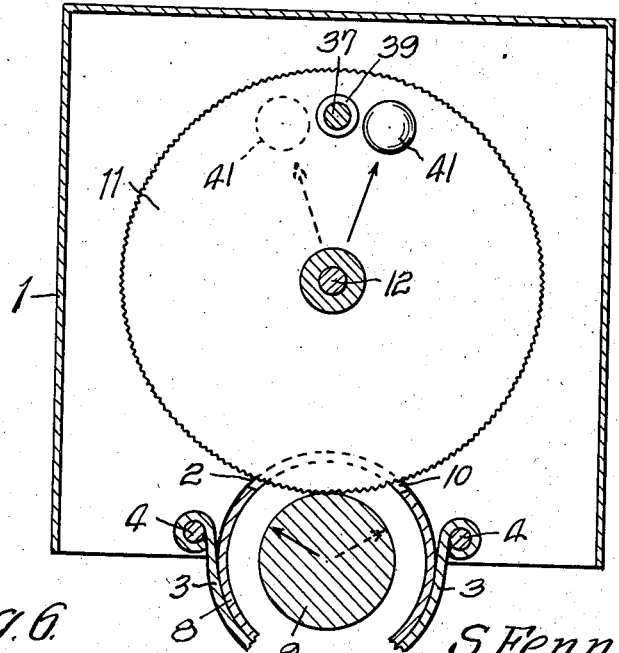
Fig. 6 is a view similar to Fig. 5, and taken on the same line as Fig. 5, but showing the steering wheel post turned to the left for closing the left signal operating circuit, as illustrated in Fig. 3.

The signal device, in one embodiment thereof, consists of a suitable supporting structure such, for instance, as a casing, or equivalent structure 1, provided with a cutaway portion 2 on opposite walls thereof. A pair of suitable clamping members 3 are hingedly connected, as at 4, to the casing adjacent the cutaway portions 2 thereof, and, the clamping members are connected near their free ends by means of a suitable fastening device 5, such, for instance, as a bolt 6 having a head 7 at one end thereof and securing nuts 8' carried by the opposite end thereof for the purpose of securely locking the instrument casing to a mast jacket or sleeve 8 through which a steering post 9 passes. The mast jacket 8 is provided with a suitable transverse slot 10, the purpose of which will be apparent hereinafter. The slot 10 is formed in the mast jacket, preferably, although not necessarily, near the lower end thereof under the engine hood of a motor vehicle.

As illustrated, I employ a suitable rotatable disk-like member 11, which is disposed within the casing 1 and provided with a transverse shaft 12 journaled in suitable bearings 13 in opposed walls of the casing 1, and, in such relation to the cutaway wall portions 2 as to allow the peripheral edge portion of the disk-like member 11 to project beyond the edges of the cutaway portions 2 of the casing 1 so that the peripheral face of the disk-like member 11, which is preferably provided with tooth like serrations 13, will frictionally engage or bite into the peripheral face of the steering post 9 to have positive driven contact therewith. By this arrangement, the disk-like member 11 is responsive to turning movement of the steering post 9 in either direction from neutral position. For instance, if the steering post 9 is turned to the right, the disk-like member 11 is turned to the left, and vice-versa.

Co-operating with the rotatable disk-like member 11, is a suitable tubular conductor 14 which is disposed in a suitable casing 15. The casing 15 is secured, as at 16, to one wall of the casing 1 and closes an opening in said wall. The casing 15 is insulated from said wall of the casing 1, as at 17. A suitable insulating member 18 has telescopic connection with the inner end of the tubular conductor 14 and the inner end face of the insulating member 18 has positive riding contact with one of the side faces of the rotatable disk-like member 11. To insure positive riding contact, a suitable coiled spring 19 is disposed within the switch casing 15 and exerts pressure against the inner end of the insulating member 18 for forcing it into positive riding contact with said face of the rotatable disk-like member 11. A suitable stem 20 projects from the outer end of the tubular conductor 14 and passes through a suitable insulated opening 21 in the outer end wall of the switch casing 15. The stem 20 is provided with securing means such, as a nut 22, to prevent longitudinal displacement of the conductor 14 relative to its casing 15. The insulated opening 21 is of such dimension as to permit oscillating movement of the tubular conductor 14 in response to turning movement, in either direction, of the rotatable disk-like member 11, which member is responsive to turning movement, in either direction, of the steering post, as hereinbefore explained.

During oscillating movement of the switch conductor 14 in one direction, it contacts a suitable terminal contact 23 at the inner end of a turn signal operating circuit A. The circuit A includes a conductor 24, and a pair of direction signal lamps designated 25 and 26. Lamp 25 represents a front "left-turn" signal, and, 26 represents a rear "left-turn" signal. The lamps are preferably secured in suitable lamp casings having glass fronts bearing suitable "left-turn" indicia thereon such, for instance, as an arrow.

During oscillating movement of the switch conductor 14, in the other direction, the switch conductor 14 contacts a suitable terminal member 27 at the inner end of a turn signal operating circuit B. The circuit B includes a conductor 28, and a pair of direction signal lamps 29 and 30. Lamp 29 represents a front "right-turn" signal, and, 30 represents a rear "right-turn" signal. The lamps 29 and 30 are preferably secured in suitable lamp casings having glass fronts bearing suitable "right-turn" indicia thereon such, for instance, as an arrow.

I also employ a main circuit C which leads from an ignition circuit D provided with a battery $d$, and a switch $d'$ of an automobile to the switch conductor 14. The ignition circuit is, of course, provided with the usual key actuated switch, not shown, for starting and stopping the vehicle motor.

In carrying out the invention, I also employ a suitable circuit breaker in the main circuit C. The circuit breaker is illustrated, for instance, as including a pair of conductor fingers 31 and 32 insulated apart at one end thereof, and secured to a suitable support 33, with insulation 34 therebetween. In this instance, a conductor including a section 35 is connected to the finger 31, and another section 36 thereof leading to the switch conductor 14 is connected to the conductor finger 32. The support 33 is secured to one of the walls of the casing 1, preferably on the wall opposite the casing wall that supports the switch conductor casing 15.

The means for actuating the circuit breaker will now be described.

A plunger stem 37 is suitably and slidably supported in an opening in one wall of the casing 1 and an opening in a wall portion of the circuit breaker support 33. The wall of the circuit breaker support is suitably spaced from the wall of the casing 1. The outer end of the plunger stem 37 is provided with an insulating tip 38 which is out of contact with the inner face of the circuit breaker finger 31 when the main circuit is closed. The inner end of the plunger stem 37 is provided with a suitable head 39 with a coiled spring 40 disposed between the head 39 and the inner face of the wall of the casing 1. This arrangement holds the plunger stem 37 in its innermost position and the breaker fingers in contact with each other, as is manifest. The head 39 on the plunger stem 37 is thus in riding or surface engagement with one face of the rotatable disk-like member 11. In order to force the plunger stem 37 outwardly to extended position to open the circuit breaker and the main circuit, I provide the rotatable disk-like member 11, on one face thereof, with a suitable protuberance 41, and at such position thereon that protuberance 41 will force itself under the head of the plunger stem head 39 to move the plunger stem 37 outwardly into its extended position for separating the fingers 31 and 32 to open the main circuit C. This operation, however, it will be understood, only takes place if, and when the steering post 9 is turned to such position as to bring the front wheels of an automobile into straight away position, or, in other words, when the vehicle is moving in a straight path, or standing with the front wheels thereof straightened out. As this operation takes place, it will be understood, I provide means to lock the plunger stem 37 in its extended position, and, this means includes a suitable locking member 42 which is pivotally connected, as at 43, to the casing 1, adjacent the circuit breaker support 33, and it is supported against the action of a suitable spring 44. The locking device is provided with a lip 45, or equivalent element, which is received in a peripheral notch 46 formed on the plunger stem 37 when the plunger stem has been moved to its projected position for holding the circuit breaker separated to open the main circuit C. While the circuit breaker is separated, it is, of course, realized that the main circuit C is open and the signal lamps are inoperative.

However, I employ means for releasing said locking device, and such means includes a suitable arm 47 disposed above a part 48 of the locking member 42, which is disposed above the plunger stem 37. The arm 47 is a part of a member 49 which is suitably mounted in a bearing suitably supported by the dash of an automobile adjacent the casing 1, and, which member 49 includes an arm 50 that is connected with the lower end of the usual spring returned foot accelerator device E of an automobile, so that when the accelerator is released from foot pressure, the accelerator causes the arm 47 to exert downward pressure on the part 48 for releasing the lip 45 from engagement in the peripheral groove in the plunger stem, thereby permitting the plunger stem 37 to return to its inner position, and, in so doing, closing the main circuit C which causes the signal lamp to light in the operating circuit indicative of the direction of turning of the steering post 9, such, for instance, as either right or left. It will be observed, that in this embodiment of the invention shown, the signal lamps will not light when the vehicle is moving in a straight path, and they will not light when turning until the accelerator has been released during turning movements of the steering wheel post if the circuit breaker has been separated.

It is to be clearly understood that a slight turning movement of the steering post 9, in either direction, will render the switch conductor 14 responsive thereto for closing the signal operating circuit responsive to the direction of the turning movement of the steering post 9 when the main circuit is closed through the circuit breaker, and, that when the front wheels of the automobile are in straight away position that both operating circuits are open, as well as the main circuit due to the circuit breaker fingers being separated. Once the circuit breaker fingers are separated, the signal operating circuits are inoperative regardless of the turning movement of the steering post until the foot accelerator is released for contacting the circuit breaker fingers to close the main circuit C.

The many advantages of the herein described invention will readily suggest themselves to those skilled in the art to which it appertains.

From the foregoing description, it will be apparent that the attention of vehicular traffic as well as the attention of pedestrians, will be attracted to the left and right turn signals. Generally speaking, owing to the convenience, automatic features, and cheapness of my invention, it is a "safety" automobile signal, and, it is believed to be very valuable from this standpoint alone.

Although only a certain form of embodiment of the invention is illustrated and described herein, it is to be understood that I do not desire to restrict, or limit myself to the very details of construction shown and described, which is merely illustrative, it being obvious that changes not involving the exercise of invention, may be made without conflicting or departing from the spirit of the invention within the scope of the appended claims.

What I claim is:

1. In a vehicle direction signal, in combination, a vehicle including a steering wheel post, a main circuit, a left hand turn signal operating circuit, a right hand turn signal operating circuit, a turn indicating lamp on the vehicle in each turn signal operating circuit, a rotatably driven member peripherally contacting the steering wheel post and directly responsive to turning movements of the steering wheel post in either direction, a protuberance on the rotatably driven member, movable means actuated by the protuberance on said rotatably driven member for opening the main circuit when the steering wheel post is in straight away driving position only, means for locking the movable means to hold the main circuit open, a switch member responsive to movement of the rotatably driven member to connect the turn signal operating circuit indicative of the turning movement of the steering wheel post with the main circuit, an accelerator pedal, and means actuated upon relief of pressure on the accelerator pedal for unlocking the movable means for closing the main circuit after the steering wheel post has been turned in either direction from straight away driving position.

2. In a vehicle direction signal, in combination, a vehicle including a steering wheel post, an accelerator pedal, a main circuit, a switch in the main circuit, rotatably driven means peripherally engaged with the steering wheel post and directly responsive to turning movements of the post in either direction, a facial protuberance on said rotatably driven means, slidable means actuated by the protuberance on said rotatably driven means for opening the switch in the main circuit when the steering wheel post is in straight drive away position, means for locking the slidable means to hold said switch open regardless of the position of the steering wheel post, a pair of turn signal operating circuits indicative of the turning movements of the steering wheel post, a lamp on the vehicle in each turn signal operating circuit, a switch member in the main circuit responsive to said rotatably driven means to connect the turn signal operating circuit indicative of the turning movements of the steering wheel post with the main circuit, and means actuated upon relief of pressure on the accelerator pedal to unlock the slidable means for closing the switch in the main circuit to cause the lamp in the turn signal operating circuit indicative of the turning movement of the steering wheel post to become operative until such time as the steering wheel post has been turned back to straightaway driving position.

3. A motor vehicle direction signal having, in combination, a casing adapted to be attached to a steering wheel post sleeve having a slot therein, a rotatably driven member projecting through said slot for peripheral engagement with the steering wheel post and directly responsive to turning movements of the post, a main circuit, a switch in the main circuit, a plunger spring controlled in one direction associated with the switch, means on the rotatably driven member to move the plunger against the action of the spring for opening the switch when the steering wheel post is in straight away driving position, latching means for locking the plunger to hold the switch open, means for actuating the latching means to unlock the plunger to allow the switch to close when the steering wheel post is not in straight away driving position, a pair of turn signal lamp operating circuits indicative of the turning movements of the steering wheel post, an oscillatory switch member in the main circuit responsive to turning movements in either direction of the rotatably driven member, a conductor leading from a source of electrical supply connected to one side of the switch in the main circuit, a conductor leading from the other side of said switch to said oscillatory switch member for connecting the turn signal lamp circuit indicative of the turning movement of the steering wheel post with the main circuit.

4. In a vehicle direction signal, a casing adapted to be attached to a motor vehicle steering wheel post sleeve having a slot therein, a rotatably driven member projecting through said slot to peripherally engage a steering wheel post, rotatable in said sleeve, and directly responsive to turning movements of the post, a main circuit, a pair of separable contact fingers in said circuit, a plunger spring controlled in one direction of movement, means on said rotatably driven member for imparting outward movement to said plunger to separate said fingers for opening the main circuit when the steering wheel post is in straight away driving position, means for latching the plunger to hold said circuit open, means for unlatching the plunger to permit contact of said fingers for closing the main circuit when the steering wheel post is not in straight away driving position, a pair of turn signal lamp operating circuits, a contact in each turn signal lamp operating circuit, and a tiltable switch member in the main circuit responsive to turning movements in either direction of the rotatably driven member for connecting the turn signal lamp circuit indicative of the turning movement of the steering wheel post with the main circuit.

5. In a direction signal for motor vehicles, in combination, a steering wheel post, a main circuit, left and right turn signal operating circuits, a lamp in each signal operating circuit and carried by the vehicle, a source of energy adapted to be placed in communication with the circuits, a member having peripheral contact with the steering wheel post and adapted to be rotated by movements of the post, a pair of contact fingers in the main circuit, means for separating the fingers to open the circuit and to allow contact of the fingers for closing the circuit, a tiltable switch member in the main circuit adapted to be operated by the rotatable member, a contact for each signal circuit adapted to be engaged by the tiltable switch member for selectively connecting the left and right turn signal operating circuits with the main circuit, means adapted to be operated by the rotatable member for holding the contact fingers separated when the steering wheel post is positioned for straight away driving, and means for holding the contact fingers separated, if so desired, regardless of the position of the steering wheel post.

6. In a vehicle direction signal, in combination, a steering wheel post, a foot accelerator pedal and a source of electrical energy, right and left turn signal lamps carried by the vehicle, a main circuit, a right turn signal lamp operating circuit, a left turn signal lamp operating circuit, a circular rotatably driven member in peripheral contact with the steering wheel post, a protuberance on the rotatably driven member, slidable means actuated by the protuberance on the rotatably driven member for opening the main circuit when the steering wheel post is in straight away driving position, means for locking the slidable means to hold the main circuit open, a switch member in the main circuit directly responsive to movement of the rotatably driven member to connect the signal lamp operating circuit, indicative of the turning movement of the steering wheel post with the main circuit, and means to effect release of the locking means for closing of the main circuit when the steering wheel post is in any position but straight away driving position, upon relief of foot pressure on the foot accelerator pedal.

S. FENNER ADAM.